(12) United States Patent
Takeshita

(10) Patent No.: US 8,612,507 B2
(45) Date of Patent: Dec. 17, 2013

(54) COMPUTING DEVICE, CALCULATING METHOD, AND PROGRAM PRODUCT

(75) Inventor: Hiroki Takeshita, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 736 days.

(21) Appl. No.: 12/761,946

(22) Filed: Apr. 16, 2010

(65) Prior Publication Data
US 2010/0274831 A1    Oct. 28, 2010

(30) Foreign Application Priority Data

Apr. 23, 2009 (JP) ................................ 2009-105466
Feb. 26, 2010 (JP) ................................ 2010-042907

(51) Int. Cl.
G06F 7/32 (2006.01)
G06F 15/00 (2006.01)
G06F 15/76 (2006.01)

(52) U.S. Cl.
USPC .............................. 708/520; 712/22; 712/11

(58) Field of Classification Search
USPC ............ 708/514, 520; 705/35–38; 712/10–22
See application file for complete search history.

(56) References Cited

U.S. PATENT DOCUMENTS

| 5,187,801 | A * | 2/1993 | Zenios et al. .................... | 712/22 |
| 6,205,533 | B1 * | 3/2001 | Margolus ......................... | 712/13 |
| 8,090,636 | B2 * | 1/2012 | Thomas et al. .................. | 705/35 |
| 2004/0068642 | A1 | 4/2004 | Tanaka et al. | |
| 2006/0218376 | A1 * | 9/2006 | Pechanek ......................... | 712/11 |
| 2008/0147767 | A1 * | 6/2008 | Le Grand ......................... | 708/490 |
| 2010/0030600 | A1 * | 2/2010 | Thomas et al. .................... | 705/7 |
| 2010/0119151 | A1 * | 5/2010 | Bhattacharyay et al. ....... | 382/173 |
| 2010/0281483 | A1 * | 11/2010 | Rakib et al. .................... | 718/102 |

FOREIGN PATENT DOCUMENTS

| JP | 2003-202991 A | 7/2003 |
| JP | 3958662 B2 | 8/2007 |

OTHER PUBLICATIONS

A. V. Gerbessiotis, "Architecture independent parallel binomial tree option price valuations," Parallel Comput., vol. 30, issue 2, pp. 301-316, 2004.*

Q. Jin, D. B. Thomas, W. Luk, and B. Cope, "Exploring reconfigurable architectures for binomial-tree pricing models," in Proceedings of the 4th international workshop on Applied Reconfigurable Computing. LNCS 4943. Springer-Verlag, pp. 245-255, 2008.*

J.E. Brandenburg, D.S. Scott, "Parallel Implementation of Triangular Computation Graphs on the iPSC/2 and the iPSC/860," Proceedings of the Fifth Distributed Memory Computing Conference, vol. 2, pp. 1348-1352, 1990.*

* cited by examiner

*Primary Examiner* — Chuong D Ngo
*Assistant Examiner* — Matthew Sandifer
(74) *Attorney, Agent, or Firm* — Arent Fox LLP

(57) ABSTRACT

A computing device includes: a deciding unit which, in computation of values of nodes on a lattice in a direction where a value of m representing a horizontal axis coordinate of the lattice increases, decides dummy nodes to be added to m=n−1, so as to enable values of nodes on m=n to be calculated by adding the dummy nodes to m=n−1 and executing a vector operation through the use of the SIMD function by using values of nodes on m=n−1 and values of the added dummy nodes; an adding unit adding the dummy nodes decided by the deciding unit to m=n−1; and a calculating unit calculating the values of the nodes present on m=n by executing the vector operation through the use of the SIMD function by using the values of the nodes on m=n−1 and the values of the dummy nodes added by the adding unit.

3 Claims, 23 Drawing Sheets

FIG.1A

ELEMENT-BY-ELEMENT MULTIPLICATION

| ARGUMENT 1 | | ARGUMENT 2 | | RESULT |
|---|---|---|---|---|
| 1 | | 9 | | 9 |
| 2 | | 10 | | 20 |
| 3 | | 11 | | 33 |
| 4 | × | 12 | = | 48 |
| 5 | | 13 | | 65 |
| 6 | | 14 | | 84 |
| 7 | | 15 | | 105 |
| 8 | | 16 | | 128 |

PRIOR ART

FIG.1B

ELEMENT-BY-ELEMENT ADDITION

| ARGUMENT 1 | | ARGUMENT 2 | | RESULT |
|---|---|---|---|---|
| 1 | | 9 | | 10 |
| 2 | | 10 | | 12 |
| 3 | | 11 | | 14 |
| 4 | + | 12 | = | 16 |
| 5 | | 13 | | 18 |
| 6 | | 14 | | 20 |
| 7 | | 15 | | 22 |
| 8 | | 16 | | 24 |

PRIOR ART

FIG.1C

ELEMENT-BY-ELEMENT MAGNITUDE COMPARISON

| ARGUMENT 1 | | ARGUMENT 2 | | RESULT |
|---|---|---|---|---|
| 1 | | | | 0 |
| 2 | | | | 0 |
| 3 | > | 3 | = | 0 |
| 4 | | | | 1 |
| 5 | | | | 1 |
| 6 | | | | 1 |
| 7 | | | | 1 |
| 8 | | | | 1 |

PRIOR ART

FIG.1D

ELEMENT-BY-ELEMENT NONLINEAR OPERATION

| | ARGUMENT 1 | | RESULT |
|---|---|---|---|
| | 1 | | 2.7183 |
| | 2 | | 7.3891 |
| | 3 | | 20.086 |
| exp( | 4 | ) = | 54.598 |
| | 5 | | 148.41 |
| | 6 | | 403.43 |
| | 7 | | 1096.6 |
| | 8 | | 2981 |

PRIOR ART

PRIOR ART

PRIOR ART

*FIG.4*

$V(m, l) = f(V(m-1, l+1), V(m-1, l), V(m-1, l-1)) \cdots \text{FORWARD}$

PRIOR ART

FIG. 7B $$\begin{bmatrix} V(3,3) \\ V(3,2) \\ V(3,1) \\ V(3,0) \\ V(3,-1) \\ V(3,-2) \\ V(3,-3) \end{bmatrix} = f\left( \begin{bmatrix} d \\ d \\ V(2,2) \\ V(2,1) \\ V(2,0) \\ V(2,-1) \\ V(2,-2) \end{bmatrix}, \begin{bmatrix} d \\ V(2,2) \\ V(2,1) \\ V(2,0) \\ V(2,-1) \\ V(2,-2) \\ d \end{bmatrix}, \begin{bmatrix} V(2,2) \\ V(2,1) \\ V(2,0) \\ V(2,-1) \\ V(2,-2) \\ d \\ d \end{bmatrix} \right)$$

FIG. 7C $V(3,3) = f(d, d, V(2,2))$
$V(3,2) = f(d, V(2,2), V(2,1))$
$V(3,1) = f(V(2,2), V(2,1), V(2,0))$
$V(3,0) = f(V(2,1), V(2,0), V(2,-1))$
$V(3,-1) = f(V(2,0), V(2,-1), V(2,-2))$
$V(3,-2) = f(V(2,-1), V(2,-2), d)$
$V(3,-3) = f(V(2,-2), d, d)$

FIG.7D $$V(m,l) = V(m-1, l+1) \cdot p_{down}(m,l) + V(m-1, l), \cdot p_{middle}(m,l) + V(m-1, l-1) \cdot p_{up}(m,l)$$

FIG.7E $$\begin{bmatrix} V(3,3) \\ V(3,2) \\ V(3,1) \\ V(3,0) \\ V(3,-1) \\ V(3,-2) \\ V(3,-3) \end{bmatrix} = \begin{bmatrix} d_1 \\ d_1 \\ V(2,2) \\ V(2,1) \\ V(2,0) \\ V(2,-1) \\ V(2,-2) \end{bmatrix} \times \begin{bmatrix} d_2 \\ d_2 \\ p_{down}(3,1) \\ p_{down}(3,0) \\ p_{down}(3,-1) \\ p_{down}(3,-2) \\ p_{down}(3,-3) \end{bmatrix} + \begin{bmatrix} d_1 \\ V(2,2) \\ V(2,1) \\ V(2,0) \\ V(2,-1) \\ V(2,-2) \\ d_1 \end{bmatrix} \times \begin{bmatrix} d_2 \\ p_{middle}(3,2) \\ p_{middle}(3,1) \\ p_{middle}(3,0) \\ p_{middle}(3,-1) \\ p_{middle}(3,-2) \\ d_2 \end{bmatrix} + \begin{bmatrix} V(2,2) \\ V(2,1) \\ V(2,0) \\ V(2,-1) \\ V(2,-2) \\ d_1 \\ d_1 \end{bmatrix} \times \begin{bmatrix} p_{up}(3,3) \\ p_{up}(3,2) \\ p_{up}(3,1) \\ p_{up}(3,0) \\ p_{up}(3,-1) \\ d_2 \\ d_2 \end{bmatrix}$$

FIG.10B $$\begin{bmatrix} V(3,1) \\ V(3,0) \\ V(3,-1) \end{bmatrix} = f\left( \begin{bmatrix} V(2,2) \\ V(2,1) \\ V(2,0) \end{bmatrix}, \begin{bmatrix} V(2,1) \\ V(2,0) \\ V(2,-1) \end{bmatrix}, \begin{bmatrix} V(2,0) \\ V(2,-1) \\ V(2,-2) \end{bmatrix} \right)$$

FIG.17A $$z(1) = f(x(1), y(1))$$
$$z(2) = f(x(2), y(2))$$
$$z(3) = f(x(3), y(3))$$
$$z(4) = f(x(4), y(4))$$
$$\vdots$$
$$z(n) = f(x(n), y(n))$$

FIG.17B $$\begin{bmatrix} z(1) \\ z(2) \\ z(3) \\ z(4) \\ \vdots \\ z(n) \end{bmatrix} = f\left( \begin{bmatrix} x(1) \\ x(2) \\ x(3) \\ x(4) \\ \vdots \\ x(n) \end{bmatrix}, \begin{bmatrix} y(1) \\ y(2) \\ y(3) \\ y(4) \\ \vdots \\ y(n) \end{bmatrix} \right)$$

FIG.18A $V(3, 3) = f(V(2, 4)), V(2, 2))$
$V(3, 1) = f(V(2, 2)), V(2, 0))$
$V(3, -1) = f(V(2, 0)), V(2, -2))$
$V(3, -3) = f(V(2, -2)), V(2, -4))$

FIG.18B $$\begin{bmatrix} V(3, 3) \\ V(3, 1) \\ V(3, -1) \\ V(3, -3) \end{bmatrix} = f \left( \begin{bmatrix} d \\ V(2, 2) \\ V(2, 0) \\ V(2, -2) \end{bmatrix}, \begin{bmatrix} V(2, 2) \\ V(2, 0) \\ V(2, -2) \\ d \end{bmatrix} \right)$$

VECTOR 1   VECTOR 2

FIG.19

$$V(m, l) = V(m-1, l+1) \cdot p_{down}(m, l) + V(m-1, l-1) \cdot p_{up}(m, l)$$

FIG.20

$$\begin{bmatrix} V(3,3) \\ V(3,1) \\ V(3,-1) \\ V(3,-3) \end{bmatrix} = \begin{bmatrix} d_1 \\ V(2,2) \\ V(2,0) \\ V(2,-2) \end{bmatrix} \times \begin{bmatrix} d_1 \\ p_{down}(3,1) \\ p_{down}(3,-1) \\ p_{down}(3,-3) \end{bmatrix} + \begin{bmatrix} V(2,2) \\ V(2,0) \\ V(2,-2) \\ d_1 \end{bmatrix} \times \begin{bmatrix} p_{up}(3,3) \\ p_{up}(3,1) \\ p_{up}(3,-1) \\ d_2 \end{bmatrix}$$

US 8,612,507 B2

COMPUTING DEVICE, CALCULATING METHOD, AND PROGRAM PRODUCT

CROSS-REFERENCE TO RELATED APPLICATIONS

This application is based upon and claims the benefit of priority of the prior Japanese Patent Application Nos. 2009-105466, filed on Apr. 23, 2009, and 2010-042907, filed on Feb. 26, 2010, the entire contents of which are incorporated herein by reference.

BACKGROUND OF THE INVENTION

1. Field of the Invention

The present invention relates to a computing device, a calculating method, and a program product.

2. Description of the Related Art

Conventionally, especially in image processing and graphics fields, a very large volume of computation is involved and real-time computation has to be repeated many times. However, such computation mostly has the following patterns.

(1) computation by matrix and vectors (for example, computation of the rotation of coordinate axes and so on)
(2) repetition of the same operation on a large number of data (for example, computation for inverting color of an entire image, and the like)

To meet a need for speeding up these processes, a function called SIMD (Single Instruction Multiple Data) (hereinafter, referred to as a SIMD function) is implemented in a CPU or a graphics card (GPU (Graphics Processing Unit)).

FIG. 1A to FIG. 1D are explanatory charts showing examples of the SIMD function.

In a regular operation, one operation is executed on one set of arguments in a single clock cycle of the CPU, but utilizing the SIMD function makes it possible to execute the same kind of operation on, for example, eight sets of arguments in a single clock cycle (in some operation, one of the arguments is not a vector but is a scalar). Some CPU implemented with the SIMD function is capable of a comparison operation (equal sign, magnitude relation) other than four operations, and depending on a library, is capable of calculating nonlinear functions such as $\exp(x)$, $\sin(x)$, and $\cos(x)$. Further, by using these libraries or the like, it is sometimes possible to speed up not only vector/matrix computations generally used in linear algebra but also nonlinear computation.

[Patent Document 1] Japanese Patent No. 3958662

Numerical calculating methods include a lattice method.

FIG. 2 is an explanatory chart of the lattice method. In FIG. 2, m represents a horizontal axis coordinate of a lattice. Further, in FIG. 2, l represents a vertical axis coordinate of the lattice. Note that FIG. 2 shows a trinomial lattice as an example of the lattice. The numerical computation in the lattice method comes in various patterns, but in many cases, values of all the nodes of the lattice can be computed successively by the same kind of operation. The lattice computation includes forward (rightward) computation and backward (leftward) computation, but the principle of the computation is the same for the both.

FIG. 3 is an explanatory chart of a method of the forward computation of values of nodes present on m=3.

In the forward computation of values of nodes (1), (2) present on m=3, a computing device uses, for the computation, values of black circular and white circular nodes present on m=2 respectively. Here, the values of the nodes differ depending on a model to which the lattice method is applied, but for example, when the lattice method is applied to financial engineering and the like, these values are stock quotes, interest rates, and the like. As for the values of the nodes, one node does not necessarily hold one value and one node sometimes holds a plurality of values. Further, taking a case where the values of the lattice are stock quotes as an example, the ups and downs shown in FIG. 3 represent probability change of the stock quotes.

FIG. 4 is a chart showing an example of a formula for calculating values of nodes. In FIG. 4, a function f depends on a model to which the lattice method is applied, on a method when the lattice method is applied to a model, or the like. When f is implemented by using SIMD, arguments of the function and return values are arrayed with the same length.

In the lattice method, the number of nodes is not fixed irrespective of the values of m as shown in FIG. 3. Specifically, for example, the number of nodes on m=2 and the number of nodes on m=3 are different (taking FIG. 1A to FIG. 1D as examples, the number of argument elements and the number of result elements are different). This does not allow the operation on vectors and thus has a problem that the SIMD function cannot be used (or applied). Therefore, there arises a problem that, even with a processor such as a CPU having the SIMD function, it is not possible to speed up computation processing due to the inability to use of the SIMD function in the computation using the lattice (lattice method).

SUMMARY OF THE INVENTION

The present invention was made in view of the above problem and has an object to speed up computation processing in the computation using a lattice.

Therefore, one aspect of the present invention is a computing device provided with a processor having a SIMD function executing a plurality of operations by a single instruction, the device including: a deciding unit which, in computation of values of nodes on a lattice in a direction where a value of m representing a horizontal axis coordinate of the lattice increases, decides dummy nodes to be added to m=n−1, so as to enable values of nodes on m=n to be calculated by adding the dummy nodes to m=n−1 and executing a vector operation through the use of the SIMD function by using values of nodes on m=n−1 and values of the added dummy nodes; an adding unit adding the dummy nodes decided by the deciding unit to m=n−1; and a calculating unit calculating the values of the nodes present on m=n by executing the vector operation through the use of the SIMD function by using the values of the nodes on m=n−1 and the values of the dummy nodes added by the adding unit.

Having the above structure, the computing device decides the dummy nodes to be added to m=n−1 so as to be able to calculate the values of the nodes on m=n by adding the dummy nodes to m=n−1 and executing the vector operation through the use of the SIMD function by using the values of the nodes on m=n−1 and the values of the added dummy nodes, adds the decided dummy nodes to m=n−1, and calculates the values of the nodes on m=n by executing the vector operation through the use of the SIMD function by using the values of the nodes on m=n−1 and the values of the added dummy nodes. Therefore, it is possible to speed up computation processing in the computation using a lattice.

Here, the processor having the SIMD function corresponds to, for example, a CPU having the SIMD function, a GPU having the SIMD function, or the like.

Another aspect of the present invention is a computing device provided with a processor having a SIMS function executing a plurality of operations by a single instruction, the device including: a deciding unit which, in computation of values of nodes on a lattice in a direction where a value of m representing a horizontal axis coordinate of the lattice increases, decides a range of nodes present on m=n, so as to enable the values to be calculated by executing a vector operation through the use of the SIMD function by using values of nodes on m=n−1; and an in-range node value calculating unit calculating values of nodes within the range decided by the deciding unit, among the nodes present on m=n, by executing the vector operation through the use of the SIMD function by using the values of the nodes on m=n−1.

Having the above structure, the computing device decides the range of the nodes on m=n so as to be able to calculate the values by executing the vector operation through the use of the SIMD function by using the values of the node on m=n−1, and calculates the values of the nodes within the range, among the nodes on m=n, by executing the vector operation through the use of the SIMD function by using the values of the nodes on m=n−1. Therefore, it is possible to speed up computation processing in the computation using a lattice.

Here, the processor having the SIMD function corresponds to, for example, a CPU having the SIMD function, a GPU having the SIMD function, or the like.

Still other aspects of the present invention may be a calculating method and a program product.

BRIEF DESCRIPTION OF THE DRAWINGS

FIG. 1A is an explanatory chart of example of a SIMD function;

FIG. 1B is an explanatory chart of example of a SIMD function;

FIG. 1C is an explanatory chart of example of a SIMD function;

FIG. 1D is an explanatory chart of example of a SIMD function;

FIG. 4 is a chart showing an example of a formula for calculating values of nodes;

FIG. 7B is a chart showing an example of an operation using the SIMD function, corresponding to FIG. 7A;

FIG. 7C is a chart showing an example of a regular operation corresponding to FIG. 7B;

FIG. 7D is a chart showing an example of a function f;

FIG. 7E is a chart showing a more concrete example of the operation in FIG. 7B in the case of the function f shown in FIG. 7D;

FIG. 10B is a chart showing an example of an operation using the SIMD function, corresponding to FIG. 10A;

FIG. 10C is a chart showing an example of a regular operation corresponding to FIG. 10B;

FIG. 14 is a chart showing an example of a formula for calculating values of nodes in the binomial model;

FIG. 17A is a chart showing n pieces of computations as targets of a vector operation;

FIG. 17B is a chart showing an image of the vector operation;

FIG. 18A is a chart showing formulas for calculating values of nodes on m=3;

FIG. 18B is a chart showing an image of the vector operation for calculating the values of the nodes on m=3;

FIG. 19 is a chart showing an example of a function f; and

FIG. 20 is a chart showing a more concrete example of the operation in FIG. 18B in a case of the function f shown in FIG. 19.

DETAILED DESCRIPTION OF THE PREFERRED EMBODIMENTS

Hereinafter, embodiments of the present invention will be described based on the drawings.

(Hardware Configuration of Computing Device)

Figure 5:
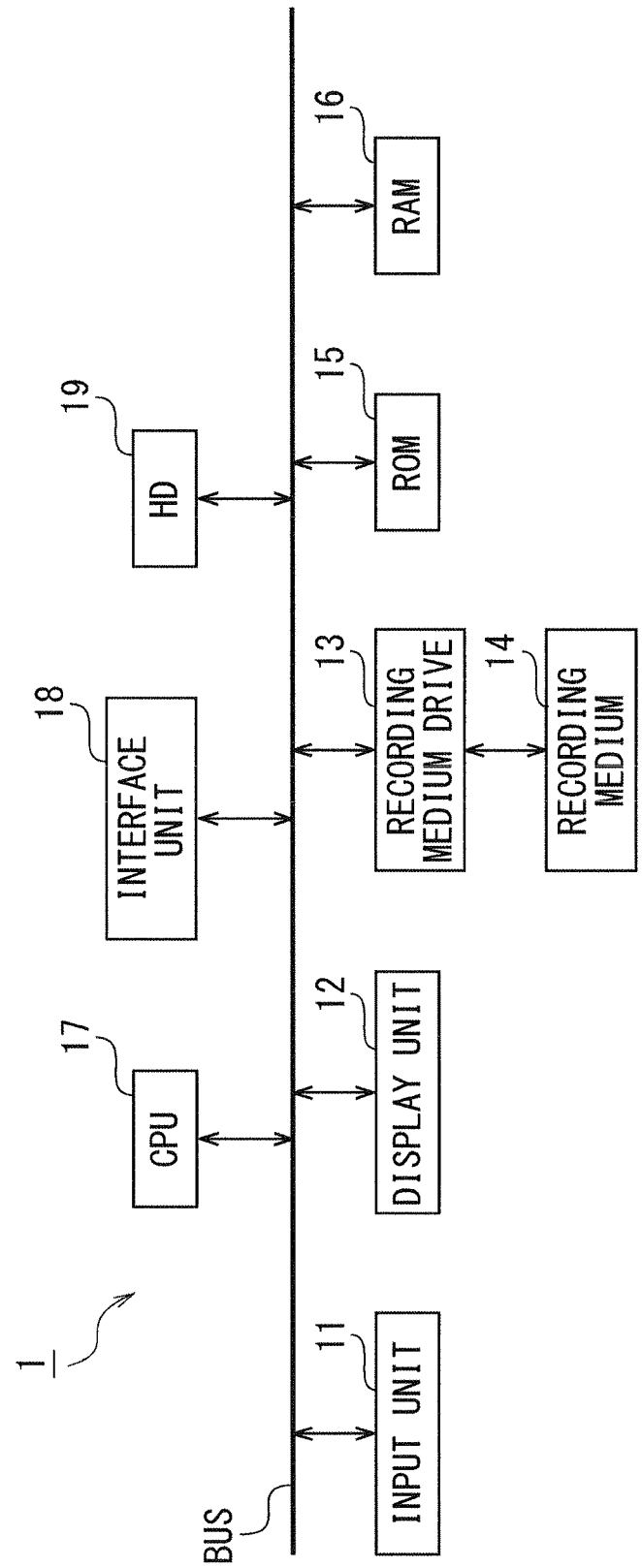
FIG. 5 is a diagram showing an example of a hardware configuration of a computing device.

FIG. 5 is a diagram showing an example of a hardware configuration of a computing device. As shown in FIG. 5, the computing device (computer) 1 includes, as the hardware configuration, an input unit 11, a display unit 12, a recording medium drive 13, a ROM (Read Only Memory) 15, a RAM (Random Access Memory) 16, a CPU (Central Processing Unit) 17, an interface unit 18, and a HD (Hard Disk) 19.

The input unit 11 is formed by a keyboard, a mouse, and the like operated by an operator of the computing device 1 and is used when the operator inputs various kinds of operation information and so on to the computing device 1. The display unit 12 is formed by a display or the like used by the operator of the computing device 1 and is used for displaying various kinds of information (or screens) and so on.

The interface unit 18 is a network connecting unit connecting the computing device 1 to a network or the like. Program products relating to later-descried functions of the computing device 1, later-described flowcharts, and so on are provided to the computing device 1, for example, from a recording medium 14 such as a CD-ROM or are downloaded to the computing device 1 via the network or the like. When the recording medium 14 is set in the recording medium drive 13, a program product is installed in the HD 19 via the recording medium drive 13 from the recording medium 14.

The ROM 15 records a program product or the like first read upon power on of the computing device 1. The RAM 16 is a main memory of the computing device 1. The CPU 17 reads a program product and data from the HD 19 when necessary, stores the read program product and data in the RAM 16, and executes the program product to realize processing and so on relating to the later-described functions and the later-described flowcharts. The CPU 17 of this embodiment has a SIMD function.

It should be noted that the computing device 1 does not necessarily have to include the input unit 11, the display unit 12, the recording medium drive 13, and so on as the hardware configuration.

—Embodiment 1—

(Outline of Processing in Embodiment 1)

As described above, a computing device computing values of nodes on a lattice in a direction where a value of m being a horizontal axis of the lattice increases has a problem of the inability to calculate values of nodes on m=n by a vector operation by using values of nodes on m=n−1 because the number of the nodes on m=n−1 and the number of the nodes on m=n are different.

This embodiment solves the above problem in the following manner. In order to be capable of calculating the values of the nodes on m=n by adding dummy nodes to m=n−1 according to the number of the nodes on m=n and executing the vector operation through the use of the SIMD function by using the values of the nodes on m=n−1 and the values of the added dummy nodes, the computing device 1 decides the number of the dummy nodes to be added, adds the decided number of the dummy nodes to m=n−1, and calculates the values of the nodes present on m=n by executing the vector operation through the use of the SIMD function by using the values of the nodes on m=n−1 and the values of the added dummy nodes.

That is, if a difference between the number of argument elements and the number of result elements does not allow the use of the vector operation for calculating the result elements, the computing device 1 decides dummy elements to be added to the arguments according to the number of the result elements and adds the dummy elements to the arguments. Then, through the use of the SIMD function, the computing device 1 calculates the values of the result elements by executing the vector operation by using the original argument elements and the added dummy elements.

Hereinafter, the processing of this embodiment will be described in detail.

(Functional Configuration of Computing Device of Embodiment 1)

Figure 6:
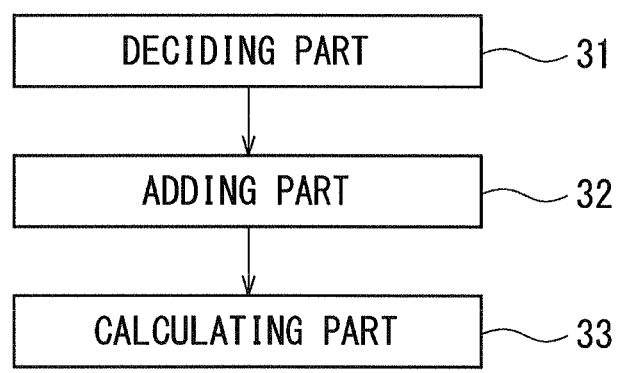
FIG. 6 is a diagram showing an example of a functional configuration of a computing device of an embodiment 1.

FIG. 6 is a diagram showing an example of a functional configuration of the computing device of the embodiment 1. As shown in FIG. 6, the computing device includes, as the functional configuration, a deciding part 31, an adding part 32, and a calculating part 33.

The deciding part 31 decides the number (and positions) of the dummy nodes to be added so that the values of the nodes on m=n can be calculated by adding the dummy nodes to m=n−1 according to the number of the nodes on m=n (and the number of the nodes on m=n−1), and through the use of the SIMD function, executing the vector operation by using the values of the nodes on m=n−1 and the values of the added dummy nodes.

Figure 2:
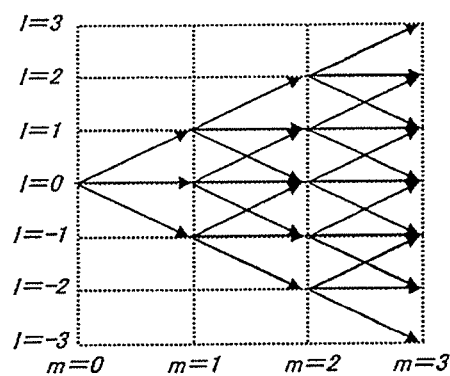
FIG. 2 is an explanatory chart of a lattice method.
Figure 3:
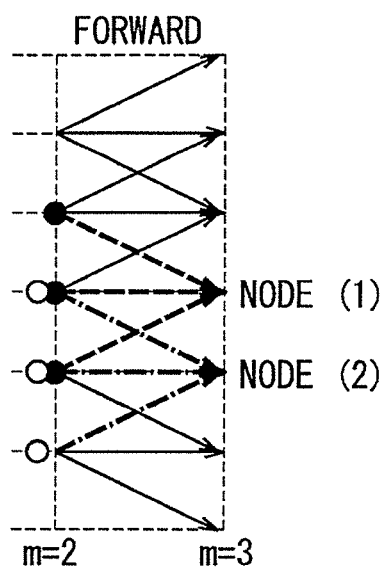
FIG. 3 is an explanatory chart of a method of forward computation of nodes present on m=3.
Figure 7A:
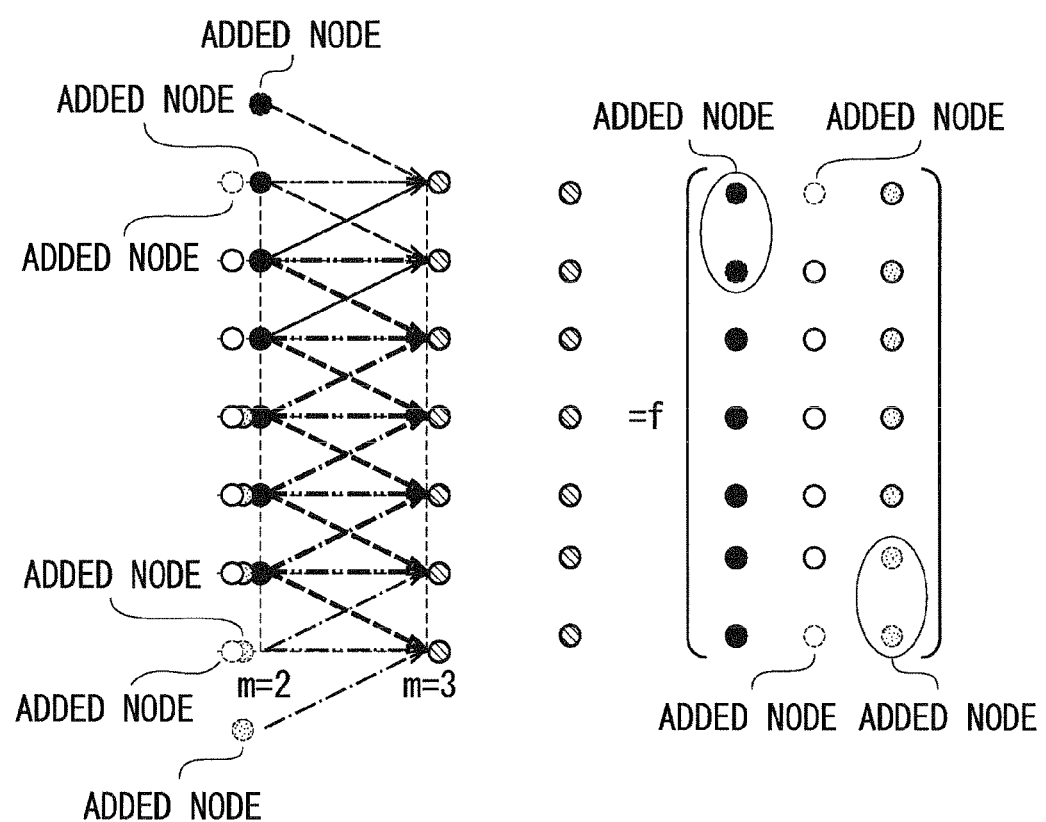
FIG. 7A is an explanatory chart showing how the number of dummy nodes to be added is decided.

FIG. 7A is an explanatory chart showing how the number of the dummy nodes to be added is decided. In the case of the lattice shown in FIG. 2, the number of the nodes on m=2 is five and the number of the nodes on m=3 is seven. In the case of the example in FIG. 7A, the deciding part 31 decides that six dummy nodes should be added so that the values of the nodes on m=n can be calculated by adding the dummy nodes to m=n−1 according to the number (7) of the nodes on m=3 (and the number (5) of the nodes on m=2) and executing the vector operation through the use of the SIMD function by using values of the nodes on m=n and values of the added dummy nodes. Incidentally, the deciding part 31 not only decides the number of the dummy nodes to be added to m=n−1 but also decides the positions of the added dummy nodes involved in the vector operation as shown in FIG. 7A.

More concretely, in a case of a trinomial lattice, in the calculation of the values of the nodes on m=n, the deciding part 31 decides the number and the positions of the added dummy nodes so that three arrows come from m=n−1 (three from above, from side, and from under) to each of the nodes.

FIG. 7B is a chart showing an example of the operation using the SIMD function, corresponding to FIG. 7A. Further, FIG. 7C is a chart showing an example of a regular operation corresponding to FIG. 7B. In FIG. 7B and FIG. 7C, d represents the value of each of the dummy nodes.

Further, FIG. 7D is a chart showing an example of a function f. Further, FIG. 7E is a chart showing a more concrete example of the operation in FIG. 7B in the case of the function f shown in FIG. 7D. In FIG. 7E, "×" represents an element-by-element multiplication. Further, $d_1 = d_2 = 0$.

Returning to the description of FIG. 6 again, the adding part 32 receives information regarding the dummy nodes to be added decided by the deciding part 31 and adds the dummy nodes in number decided by the deciding part 31 at the positions decided by the deciding part 31. In adding the dummy nodes, the adding part 32 sets the values of the dummy nodes to zero.

Returning to the description of FIG. 6 again, the calculating part 33 receives information regarding the dummy nodes added by the adding part 32, and through the use of the SIMD function provided by the CPU 17, executes the vector operation by using the values of the nodes originally present on m=n−1 and the values of the added dummy nodes, thereby calculating the values of the nodes present on m=n.

(Calculation Processing of Values of Nodes in Lattice Method in Embodiment 1)

Figure 8:
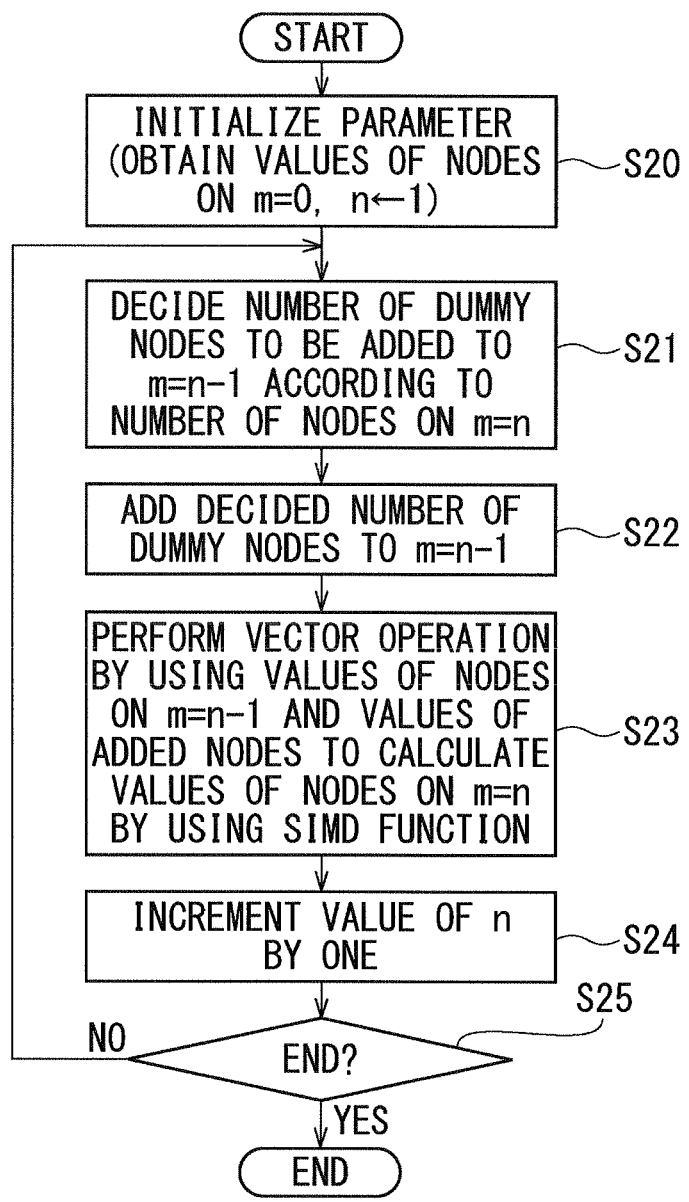
FIG. 8 is a flowchart showing an example of calculation processing of values of nodes in a lattice method in the embodiment 1.

FIG. 8 is a flowchart showing an example of calculation processing of the values of the nodes in a lattice method in the embodiment 1. For simplicity of the description, the description of FIG. 8 will be given on assumption that the CPU 17 executes the processing.

At Step S20, the CPU 17 obtains values of nodes on m=0 from the RAM 16 or the like. It is assumed that the values of the nodes on m=0 are set by a user or the like, for instance. Further, the deciding part 21 substitutes 1 in the variable n.

Subsequently, at Step S21, the CPU 17 decides the number (and the positions) of dummy nodes to be added to m=n−1 according to the number of nodes on m=n (and the number of nodes on m=n−1).

Subsequently, at Step S22, the CPU 17 adds the dummy nodes to m=n−1 based on the decision at S21.

Subsequently, at Step S23, through the use of the SIMD function provided by the CPU 17, the CPU 17 executes the vector operation by using values of the nodes originally present on m=n−1 and values of the dummy nodes added at Step S22, thereby calculating values of the nodes on m=n.

Subsequently, at Step S24, the CPU 17 increments the value of n by one.

Subsequently, at Step S25, the CPU 17 determines whether or not values of all the nodes of the lattice have been calculated, based on the value of m that is set in advance or input by a user, and so on, and determines whether or not to end the processing shown in FIG. 8. When determining that the processing shown in FIG. 8 should be ended, the CPU 17 ends the processing shown in FIG. 8. When determining that the processing shown in FIG. 8 should not be ended, the CPU 17 returns to the process at Step S21 to continue the processing of computing the values of the nodes of the lattice in a direction where the value of m representing a horizontal axis coordinate of the lattice increases.

As described above, according to this embodiment, when calculating the values of the nodes on m=n the CPU 17 increases the number of the nodes on m=n−1 by adding the dummy nodes so as to be capable of calculating the values of the nodes on m=n by executing the vector operation by using the values of the nodes on m=n−1. Then, through the use of the SIMD function provided by the CPU 17, the CPU 17 executes the vector operation by using the values of the nodes originally present on m=n−1 and the values of the added dummy nodes, thereby calculating the values of the nodes on m=n. This makes it possible to speed up the computation processing in the computation using the lattice since the CPU 17 can use the SIMD function in the computation using the lattice.

—Embodiment 2—

(Outline of Processing in Embodiment 2)

As described above, a computing device computing values of nodes on a lattice in a direction in which a value of m representing a horizontal axis coordinate of the lattice increases has a problem of the inability to calculate values of nodes on m=n by a vector operation by using values of nodes on m=n−1 because the number of the nodes on m=n−1 and the number of the nodes on m=n are different.

This embodiment solves the above problem in the following manner. According to the number of nodes on m=n−1, a computing device 1 decides a range of nodes on m=n whose values are to be calculated by a vector operation by using values of the nodes on m=n−1, and calculates the values of the nodes within the range, among nodes on m=n, by the vector operation through the use of the SIMD function by using the values of the nodes on m=n−1, and calculates values of nodes outside the range one by one.

That is, if a difference between the number of argument elements and the number of result elements does not allow the use of the vector operation for calculating the result elements, the computing device 1 limits, according to the number of the argument elements, a range of the result elements whose values can be calculated by the vector operation by using the argument elements. Then, the computing device 1 calculates the values of the elements within the limited range, among the result elements, by executing the vector operation through the use of the SIMD function by using the argument elements. Then, the computing device 1 calculates values of elements outside the limited range one by one by using the argument elements and the like without using the SIMD function.

Next, the processing in this embodiment will be described in detail.

(Functional Configuration of Computing Device of Embodiment 2)

Figure 9:
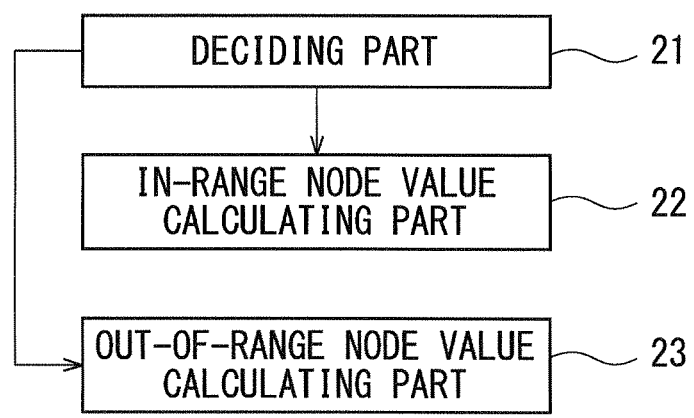
FIG. 9 is a diagram showing an example of a functional configuration of a computing device of an embodiment 2.

FIG. 9 is a diagram showing an example of a functional configuration of the computing device of the embodiment 2. As shown in FIG. 9, the computing device 1 includes, as the functional configuration, a deciding part 21, an in-range node value calculating part 22, and an out-of-range node value calculating part 23.

According to the number of nodes on m=n−1, the deciding part 21 decides a range of nodes present on m=n whose values can be calculated by the vector operation by using values of the nodes on m=n−1.

Figure 10A:
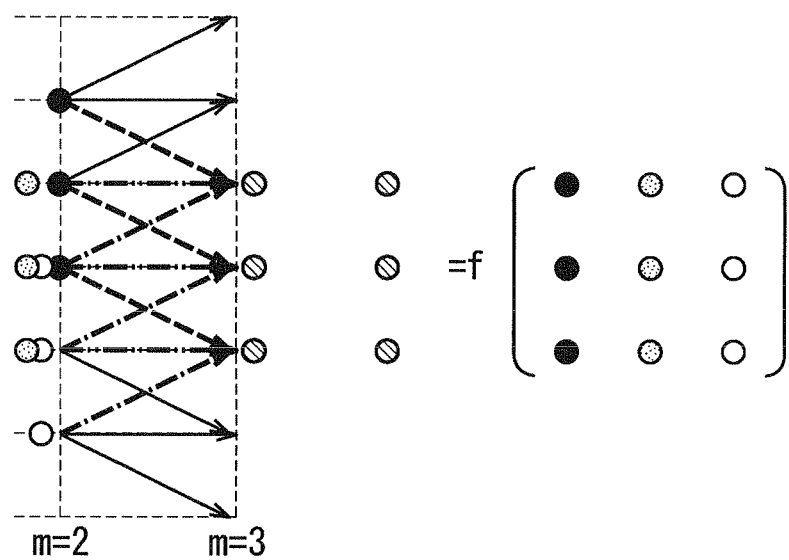
FIG. 10A is an explanatory chart showing how a range is decided.

FIG. 10A is an explanatory chart showing how the range is decided. In the case of the lattice shown in FIG. 2, the number of the nodes on m=2 is five and the number of the nodes on m=3 is seven. In the case of the example in FIG. 10A, according to the number (5) of the nodes on m=2, the deciding part 21 decides three nodes in the middle among the seven nodes as the range of the nodes on m=3 whose values can be calculated by the vector operation shown in FIG. 10A by using values of the nodes on m=2. In other words, in a case of a trinomial lattice shown in FIG. 10A, the deciding part 21 sets a range of nodes at each of which three arrows from the nodes on m=2 join, as the range of the nodes on m=3 whose values can be calculated by the vector operation shown in FIG. 10A by using the values of the nodes on m=2. As a result, in the case of the trinomial lattice shown in FIG. 2, if the value of m is two or more, the deciding part 21 decides the range so that four nodes (upper two and lower two) at the ends always fall out of the range.

FIG. 10B is a chart showing an example of the operation using the SIMD function, corresponding to FIG. 10A. Further, FIG. 10C is a chart showing an example of a regular operation corresponding to FIG. 10B.

Returning to the description of FIG. 9 again, the in-range node value calculating part 22 receives information regarding the range of the nodes decided by the deciding part 21, and calculates the values of the nodes within the range among the nodes on m=n by executing the vector operation through the use of the SIMD function provided by the CPU 17 (function of executing a plurality of operations by a single instruction), by using the values of the nodes on m=n−1. In the example in FIG. 10A, the in-range node value calculating part 22 executes the vector operation through the use of the SIMD function provided by the CPU 17, by using the values of the nodes on m=2, thereby calculating the values of the middle three nodes among the nodes on m=3.

Returning to the description of FIG. 9 again, the out-of-range node value calculating part 23 receives the information regarding the range of the nodes decided by the deciding part 21 and specifies nodes outside the range. Then, the out-of-range node value calculating part 23 calculates values of the nodes outside the range, among the nodes present on m=n one by one by using the values of the nodes on m=n−1, without using the SIMD function provided by the CPU 17.

More concretely, the out-of-range node value calculating part 23 calculates the values of the nodes outside the range among the nodes present on m=n, by using the values of the nodes, among the nodes present on m=n−1, from which the arrows directed toward the nodes outside the range extend. Incidentally, in the case of the trinomial lattice, three arrows do not come from the nodes on m=n−1 toward each of the nodes outside the range, among the nodes present on m=n. Therefore, the out-of-range node value calculating part 23 adds nodes relevant to the lacking arrows (dummy nodes) to the nodes on m=n−1 (as a result, adds them as in the above-described embodiment 1). Then, the out-of-range node value calculating part 23 calculates the values of the nodes outside the range among the nodes present on m=n one by one by using the values of the nodes from which the arrows directed toward the nodes outside the range extend, among the nodes present on m=n−1, and by using values (zero) of the added dummy nodes, without using the SIMD.

(Calculation Processing of Values of Nodes in Lattice Method in Embodiment 2)

Figure 11:
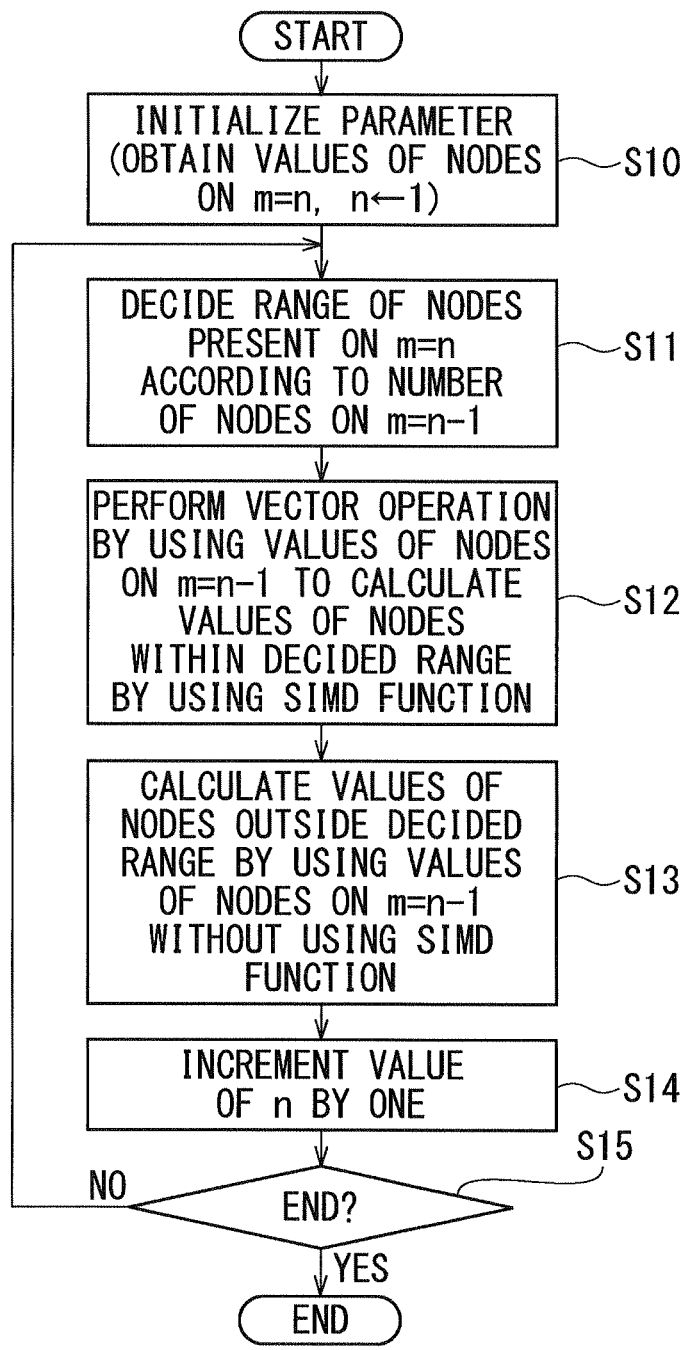
FIG. 11 is a flowchart showing an example of calculation processing of values of nodes in a lattice method in the embodiment 2.

FIG. 11 is a flowchart showing an example of calculation processing of the values of the nodes in the lattice method in the embodiment 2. In FIG. 11, for simplicity of the description, the description will be given on assumption that the CPU 17 executes the processing.

At Step S10, the CPU 17 obtains values of nodes on m=0 from the RAM 16 or the like. It is assumed that the values of the nodes on m=0 are set by a user or the like, for instance. Further, the deciding part 21 substitutes 1 in the variable n.

Subsequently, at Step S11, the CPU 17 decides a range of nodes present on m=n according to the number of nodes on m=n−1. When n=1, the deciding part 21 decides that there is "no" range of the nodes on m=n.

Subsequently, at Step S12, through the use of the SIMD function provided by the CPU 17, the CPU 17 executes the vector operation (for example, executes the vector operation shown in FIG. 10A), by using values of the nodes on m=n−1, thereby calculating values of the nodes within the range decided at Step S11, among the nodes present on m=n.

Subsequently, at Step S13, the CPU 17 executes one-by-one calculation by using the values of the nodes on m=n−1, thereby calculating values of nodes outside the range decided at Step S11 among the nodes present on m=n without using the SIMD function provided by the CPU 17.

Subsequently, at Step S14, the CPU 17 increments the value of n by one.

Subsequently, at Step S15, based on the value of m or the like that is set in advance or input by a user, the CPU 17 determines whether or not values of all the nodes on the lattice have been calculated, and determines whether or not to end the processing shown in FIG. 11. When determining that the processing shown in FIG. 11 should be ended, the CPU 17 ends the processing shown in FIG. 11. When determining that the processing shown in FIG. 11 should not be ended, the CPU 17 returns to the process at Step S11 and continues the processing for calculating the values of the nodes on the lattice in a direction where the value of m representing a horizontal axis coordinate of the lattice increases.

As described above, according to this embodiment, when calculating the values of the nodes on m=n, the CPU 17 limits the range of the nodes on m=n whose values can be calculated by using the SIMD function, according to the number of the nodes on m=n−1, and in the limited range, calculates the values on m=n by executing the vector operation through the use of the SIMD function by using the values of the nodes on m=n−1, and outside the range, calculates the values of the nodes without using the SIMD function. Consequently, since the CPU is capable of using the SIMD function in the computation using the lattice, it is possible to speed up the computation processing in the computation using the lattice.

According to the above-described embodiment, it is possible to speed up the computation processing in the computation using the lattice.

—Embodiment 3—
(Binomial Model)

The lattice method includes a binomial model besides the trinomial model described in the embodiments 1, 2. In this embodiment, the binomial model will be described. With a Black-Scholes model, the binomial model is ranked as a typical method for calculating option prices. In the Black-Scholes model, the option prices are expressed by an analytical formula, and the option prices can be easily calculated from data such as stock quotes, exercise prices, terms, volatility, and interest rates, and the time required for the computation is also very short. However, according to the Black-Scholes model, it is possible to compute the option prices of a European type (that is, options exercisable only at the expiration of the option term), but it is not possible to compute the option prices of an American type (that is, options exercisable anytime prior to the expiration of the option term).

On the other hand, in the binomial model, the computation for predicting a change in the underlying asset prices is performed on assumption that the underlying asset prices repeatedly present either a rising change or a lowering change, and thereafter, the option prices are calculated by inverse computation from the predicted future underlying asset prices, which requires a long time for the computation. However, according to the binomial model, it is possible to compute the option prices not only of the European type but also of the American type and an exotic type.

Figure 12:
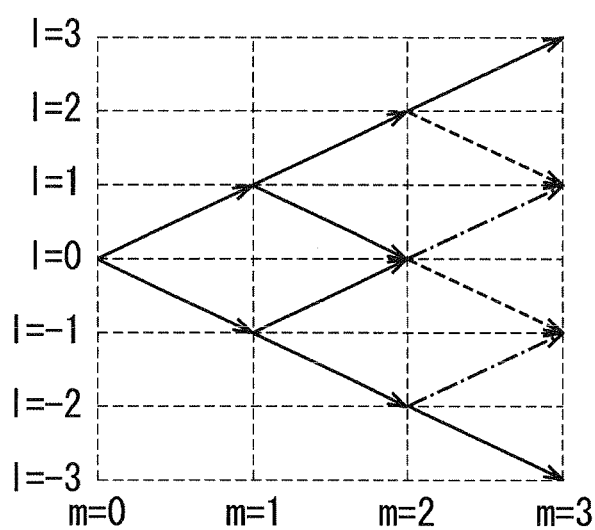
FIG. 12 is a chart showing a lattice in a binomial model.

FIG. 12 is a chart showing a lattice of the binomial model. In the binomial model, a value of an underlying asset price at each node of the lattice (hereinafter, referred to as a value of a node) is calculated. In FIG. 12, each node of the lattice is expressed by using coordinates (m, l). m on the horizontal axis corresponds to a term, and as the term passes, m increases. l on the vertical axis corresponds to the change in the underlying asset price, and as the underlying price increases, l increases, and as the underlying price decreases, l decreases. Each node of the binomial model branches off into two branches representing an increase in the underlying asset price (increase in l) or a decrease thereof (decrease in l) every time the term passes (m increases). On each m, at nodes except both end nodes (at l having the maximum value and at l having the minimum value), the branches branching on an immediately preceding m join together. In this manner, in the binomial model, as the term passes, the branching and the joining of the branches extending from nodes are repeated, resulting in a shape where rhombus lattices are linked.

Figure 13:
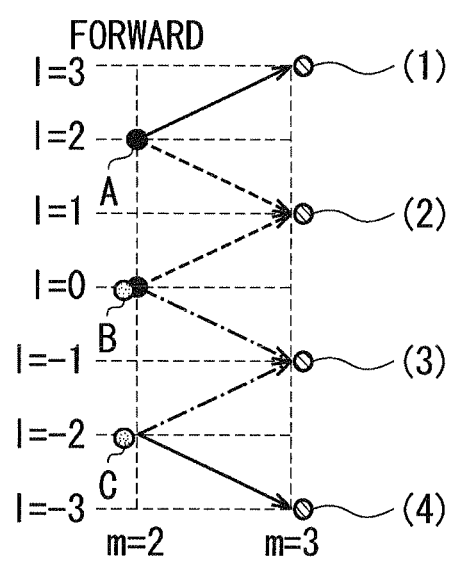
FIG. 13 is an explanatory chart of computation of underlying asset prices in the binomial model.

FIG. 13 is an explanatory chart of the computation of the underlying asset prices in the binomial model. The computation of values of nodes in the binomial model includes forward computation (computation in a direction where m increases) and backward computation (computation in a direction where m decrease), but in this embodiment, a case of the forward computation will be described. FIG. 13 shows an image of a case where values of nodes on m=3 are calculated from values of nodes on m=2.

In the example shown in FIG. 13, a value of a node (1) is calculated from a value of a node A, a value of a node (2) is calculated from the value of the node A and a value of a node B, a value of a node (3) is calculated from the value of the node B and a value of a node C, and a value of a node (4) is calculated from the value of the node C. As shown in FIG. 13, coordinates of the nodes A, B, C are (2, 2), (2, 0), and (2, −2) respectively, and coordinates of the nodes (1), (2), (3), and (4) are (3, 3), (3, 1), (3, −1), and (3, −3) respectively.

Figure 14:
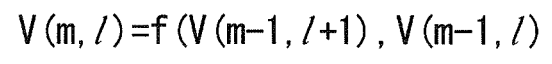

FIG. 14 is a chart showing an example of a formula for calculating values of nodes in the binomial model. In the example shown in FIG. 14, V(m, l) is a value of a node at coordinates (m, l), and it is shown that the value of the node is calculated by a function f. This function f differs depending on a target of an option trade such as a stock quote, foreign exchange, and an interest rate.

For example, the value of the node (2) shown in FIG. 13 is calculated by V(3, 1)=f(V(2, 2), V(2, 0)), with the values of the nodes A and B as arguments. Further, the value of the node (3) is calculated by V(3, −1)=f(V(2, 0), V(2, −2)), with the values of the nodes B and C as arguments. This function f is used not only for calculating the values of the nodes on m=3 from the values of the nodes on m=2 but also for calculating values of nodes on other m. That is, when the values of the nodes in the binomial model are calculated, the same kind of computation expressed by the function f is repeated.

Generally, when the binomial model is employed in the computation of option prices, the number of nodes as computation targets becomes very large since m becomes 100 or more in many cases. Therefore, the use of a function of a vector operation executing the computations of the same kind in parallel, such as, for example, a SIMD function is considered in order to calculate values of all the nodes at high speed. The computation by the function f is sometimes nonlinear computation, and computing values of nodes one by one takes a long time, but some CPU has the SIMD function compatible to the nonlinear computation, and if the computations can be parallelized by using the SIMD function, it is possible to calculate the values of all the nodes at high speed.

However, values of some nodes cannot be calculated by the function f in FIG. 13. As shown in FIG. 14, the function f calculates values of nodes from two arguments. On the other hand, the value of the node (1) is calculated only from the value of the node A, and the value of the node (4) is calculated only from the value of the node C. Therefore, the values of the node (1) and the node (4) cannot be calculated by the function f having two arguments, and it is necessary to calculate them by a computation different from the function f. That is, in the binomial model, since the computations of values of nodes are not generally only the same type of computations by the function f, it is not possible to parallelize the computations of the values of the nodes by using the SIMD function, which gives rise to a problem that the computation takes a long time.

On the other hand, according to this embodiment, with the structure described below, when values of nodes in a lattice method such as the binomial model are calculated, parallelizing the computations by using the SIMD function (that is vector operation) is made possible, which enables the high-speed calculation of values of all the nodes.

(Functional Configuration of Computing Device of Embodiment 3)

Figure 15:
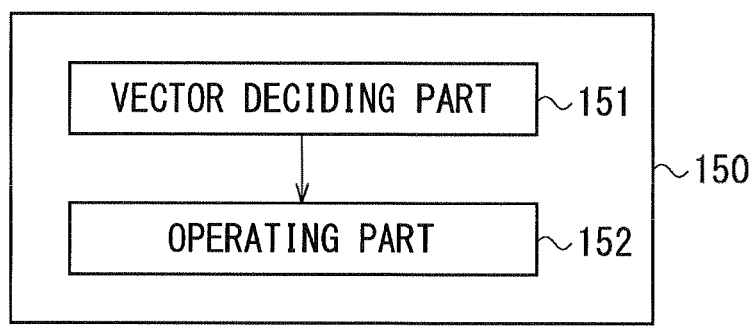
FIG. 15 is a diagram showing a functional configuration of a computing device of an embodiment 3.

FIG. 15 is a diagram showing a functional configuration of a computing device 150 of the embodiment 3. The computing device 150 includes a vector deciding part 151 and a vector operating part 152 as shown in FIG. 15. When computing values of nodes on m=n, the computing device 150 adds dummy nodes to m=n−1 to enable the vector operation using the SIMD function. The addition of the dummy nodes will be described below.

Figure 16:
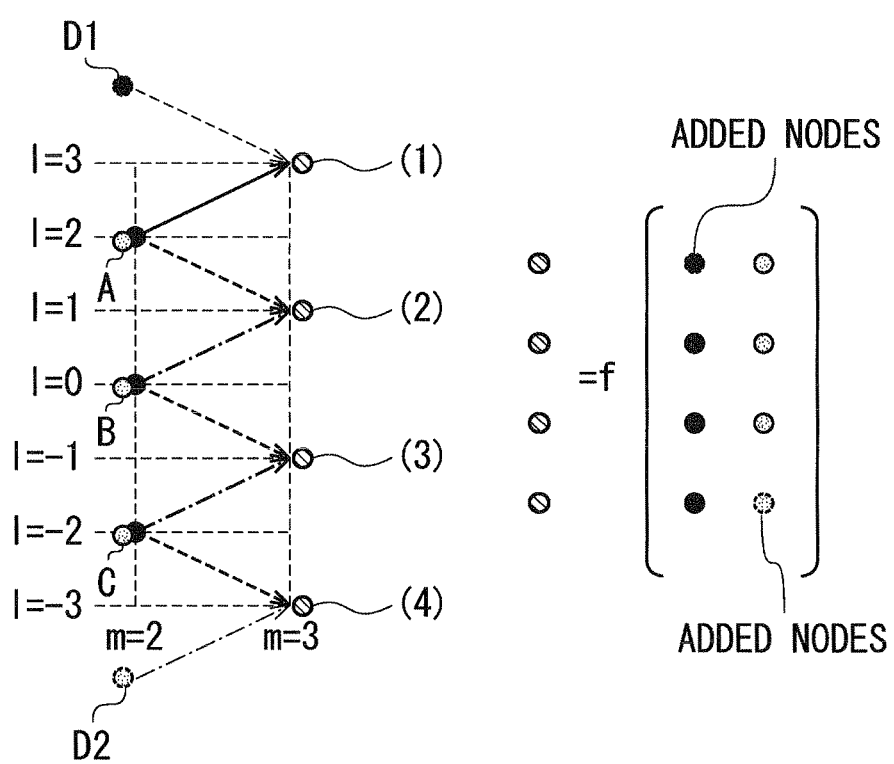
FIG. 16 is a chart showing an image of the addition of dummy nodes.

FIG. 16 is a chart showing an image of the addition of the dummy nodes. FIG. 16 shows an image of the addition of the dummy nodes when values of nodes on m=3 are computed from values of nodes on m=2. In the example shown in FIG. 16, dummy nodes D1 and D2 are added in addition to the nodes shown in FIG. 13. By adding the node D1 and the node D2, the value of the node (1) is calculated from the values of the nodes D1 and A, and the value of the node (4) is calculated from the values of the node D2 and the node C. Hereinafter, the values of the dummy nodes D1 and D2 are each represented by d. Note that coordinates of D1 and D2 correspond to (2, 4) and (2, −4) respectively.

For example, the value of the node (1) shown in FIG. 16 is calculated by $V(3, 3)=f(d, V(2, 2))$, with the values of the nodes D1 and A as arguments. Further, the value of the node (4) is calculated by $V(3, −3)=f(V(2, −2), d)$, with the values of the nodes C and D2 as arguments.

Since adding such dummy nodes makes it possible to calculate the value of any of the nodes (1) to (4) by the function f, it is possible to parallelize the computations, enabling the calculation by the vector operation. The operations of the respective parts of the computing device 150 will be more concretely described below.

In the binomial model, the number of nodes on m=n is n+1, and values of the nodes on m=n are calculated by using values of nodes on m=n−1. In the computation of the values of the nodes on m=n, the vector deciding part 151 adds data of the dummy nodes to the values of the nodes on m=n−1, thereby deciding vector element data used for the vector operation.

FIG. 17A and FIG. 17B are explanatory charts of the vector operation. FIG. 17A is a chart showing n pieces of computations as targets of the vector operation. FIG. 17A shows an example where values of z(1) to z(n) are calculated by f(x(1), y(1)) to f(x(n), y(n)) respectively. The use of the SIMD function makes it possible to execute these plural computations in one clock cycle. Incidentally, when the maximum number of parallel computations executable in one clock cycle is decided in advance for each computing device and n is over the maximum number, the vector operation is executed after computation formulas are divided in a unit of the maximum number.

FIG. 17B is a chart showing an image of the vector operation. In this embodiment, as shown in FIG. 17B, when the vector operation is executed for n pieces of computation formulas, two vectors (array data), namely, x(i) and y(i) (i=1, . . . , n) are prepared as arguments in order to enable the use of the SIMD function.

FIG. 18A and FIG. 18B are charts showing concrete examples of the vector operation in the binomial model. FIG. 18A and FIG. 18B show images of the decision of the vectors used for calculating the values of the nodes on m=3. FIG. 18A is a chart showing formulas for calculating the values of the nodes on m=3. In the binomial model, the number of the nodes on m=3 is four and the number of computation formulas is also four. The formulas shown in FIG. 18A are generated by substituting concrete values in the formula shown in FIG. 14, that is, $V(m, l)=f(V(m−1, l+1), V(m−1, l−1))$. Here, the nodes on m=2 are three nodes (2, −2), (2, 0), and (2, 2) as shown in FIG. 13, for instance, and it follows that values of V(2, 4) included in the top formula shown in FIG. 18A and V(2, −4) included in the bottom formula do not exist.

FIG. 18B is a chart showing an image of the vector operation calculating values of the nodes on m=3. In this embodiment, as shown in FIG. 18B, when the vector operation is executed, it is necessary to prepare two vectors 1 and 2 as arguments in order to enable the use of the SIMD function. The vector operations shown in FIG. 18A and FIG. 18B correspond to a case of n=4 in the vector operations shown in FIG. 17A and FIG. 17B. That is, elements of the vector 1 correspond to x(i) (i=1 to 4), and elements of the vector 2 correspond to y(i) (i=1 to 4).

Here, the operation of the computing device 150 according to this embodiment will be described, taking a case where the values of the nodes on m=3 are calculated, as an example. In the computing device 150, in the calculation of the values of the nodes on m=3, the vector deciding part 151 decides the vector 1 and the vector 2 shown in FIG. 18B. When deciding the vector 1, the vector deciding part 151, need to set V(2, 4), V(2, 2), V(2, 0), and V(2, −2) in the array data x(1) to x(4) respectively, but because of the absence of V(2, 4), it sets dummy data d instead in x(1).

Further, when deciding the vector 2, the vector deciding part 151 needs to set V(2, 2), V(2, 0), V(2, −2), V(2, −4) in the array data y(1) to y(4) in FIG. 17B respectively, but because of the absence of V(2, −4), it sets the dummy data d instead in y(4).

In this embodiment, in the calculation of the values of the nodes on each m, the vector deciding part 151 decides the vector 1 and the vector 2 by relating the values of the nodes in descending order of the coordinate l to the array data z(i) (i=1 to m+1). For example, when m=3, the vector deciding part 151 decides the vector 1 and the vector 2 by relating z(1), z(2), z(3), z(4) to V(3, 3), V(3, 1), V(3, −1), and V(3, −3) respectively. This is done not only in the case of m=3. That is, in thus deciding the vector 1 and the vector 2, when m=n for example, the vector deciding part 151 always sets the dummy data d in x(1) and y(n+1) because of the absence of data to be set in x(1) and y(n+1).

The setting of the dummy data in x(1) and y(n+1) will be described in more detail below. For example, when values of nodes on m=4 are calculated, V(4, 4) corresponds to z(1) and V(4, −4) corresponds to z(4). According to the formula in FIG. 14, the operation of V(4, 4)=f(V(3, 5), V(3, 3)) is necessary, but a value of a node corresponding to V(3, 5) is not present. Here, from the fact that V(4, 4) corresponds to z(1) as described above, it follows that V(3, 5) corresponds to x(1).

Specifically, because of the absence of data to be set in x(1), the vector deciding part 15 sets the dummy data in x(1). Further, according to the formula in FIG. 4, the operation of V(4, −4)=f(V(3, −3), V(3, −5)) is necessary, but a value of a node corresponding to V(3, −5) is not present. Here, from the fact that V(4, −4) corresponds to z(4) as described above, it follows that V(3, −5) corresponds to y(5). That is, because of the absence of data to be substituted in y(5) (=y(n+1)), the vector deciding part 151 sets the dummy data in y(n+1).

It should be noted that the structure of the vector deciding part 151 is not limited to the structure where the vector elements in which the dummy data are set, among the vector elements, are fixed, that is, is not limited to the structure where the dummy data are always set in x(1) and y(n+1). For example, the vector deciding part 151 may have the following structure. When the array data V(m, l) are prepared in correspondence to all the coordinates (m, l), the vector deciding part 151 stores data indicating the absence of a value of a node (for example, NULL or the like) in an array element at coordinates where the value of the node is not present, and when deciding the vector data, determines whether or not the value of the node is present, and sets the dummy data when the value of the node is not present.

Further, the vector deciding part 151 supplies the array data of the vector 1 and the vector 2 to the vector operating part 152. In the calculation of the values of the nodes on m=3, the vector operating part 152, upon receipt of the array data of the vector 1 and the vector 2, simultaneously calculates values of V(3, 3), V(3, 1), V(3, −1), V(3, −3) in one clock cycle by executing the vector operation shown in FIG. 18B.

FIG. 19 is a chart showing an example of the function f. Further, FIG. 20 is a chart showing a more concrete example of the operation in FIG. 18B in the case of the function f shown in FIG. 19. In FIG. 20, "×" represents an element-by-element multiplication. Here, Pdown(m, l) is a probability of a downward transition from an immediately preceding node to a node (m, l), and Pup(m, l) is a probability of an upward transition from an immediately preceding node to the node (m, l). These values are set for each node and are stored in a storage part. When performing the vector operation in order to calculate the values of the nodes at (m, l), the vector operating part 152 reads Pdown(m, l) and Pup(m, l) corresponding to the values of the nodes from the storage part and executes the operation shown in FIG. 20 by using the read Pdown(m, l) and Pup(m, l) and the vector 1 and the vector 2 from the vector deciding part 151.

$d_1$ and $d_2$ shown in FIG. 20 will be further described. $d_1$ is a value of a dummy node and represents the aforesaid dummy data d. Further, $d_2$ will be described below. In this embodiment, a not-shown computing unit calculates Pup(m, l) and Pdown(m, l) in advance to store them in the storage part. Pup and Pdown are each the probability of the transition to some node from a preceding node and are calculated by a function with m and l as arguments. For example, since Pdown(3, 3), Pup(3, −3), and the like are each a probability of the transition from a nonexistent node, the computing unit sets $d_2$ (concretely, 0) as the dummy data.

However, this is one embodiment and the function f for calculating the values of the nodes is not limited to the formula shown in FIG. 19. A feature of this embodiment definitely lies in that, in the calculation of the values of the nodes V(m, l) from the values of the nodes on m−1, the values of the nodes V(m, l) are calculated by setting the dummy data in the node whose value is not present, among the nodes on m−1. For example, in the binomial model, the feature lies in that, in the calculation of the values of the nodes V(m, l), the values of the nodes V(m, l) are calculated by setting the dummy data in V(m−1, l+1), V(m−1, l−1) at which the values of the nodes do not exist. That is, since the function f for calculating the values of the nodes is not limited to the formula shown in FIG. 19, the structure of setting the dummy data $d_2$ is not essential.

In this embodiment, "0" is set as the dummy data $d_1$ and $d_2$, but it should be noted that the value of the dummy data is not limited to "0", and may be any data not influencing the computation results in the function f.

Further, in this embodiment, the processing for deciding the vectors in order to enable the use of the SIMD function is described, taking the binomial model as an example, but the vectors can be decided also in the trinomial model by the same processing. That is, in the trinomial model, the vector deciding part 151 decides three vectors shown in FIG. 7C, but in the calculation of the values of the nodes corresponding to V(m, l) by applying the formula shown in FIG. 4, the dummy data are set in V(m−1, l+1), V(m−1, l), V(m−1, l−1) at which values of nodes do not exist. That is, in the trinomial lattice, the number of the nodes on m=n is 2n+1, and in the calculation of values of 2n+1 pieces of the nodes, since, on m=n−1, the number of the nodes whose values have been calculated is 2n−1, it is necessary to add dummy nodes as first, second, 2n-th, and 2n+1-th nodes from an upper end of the nodes.

Incidentally, when the dummy data are set, vector elements in which the dummy data are always set may be fixed. Alternatively, array data corresponding to all the coordinates may be prepared, and whether or not the values of the nodes exist may be determined every time.

Further, in this embodiment, the structure where the dummy nodes are added for the calculation in the binomial mode is described, but as described, taking the trinomial model as an example, it is also possible in the binomial model to decide the range of the nodes whose values are calculated by the vector operation. In this case, only the values of the nodes within the decided range are calculated by the vector operation through the use of the SIMD function. Then, in the case of the binomial model, when the values of the nodes on each m are calculated, targets of the vector operation using the SIMD function are only m−1 pieces of nodes except two nodes at both ends (at l with the maximum value and at l with the minimum value) on each m. That is, the vector deciding part 151 decides the vectors for calculating the formula shown in FIG. 14 by the vector operation shown in FIG. 17B, only for m−1 pieces of the nodes except the two nodes at both ends (at l with the maximum value and at l with the minimum value) on each m. Incidentally, in the case of the trinomial model, targets of the vector operation using the SIMD function are only 2m−3 pieces of the nodes except four nodes, that is, except two nodes from each of both ends (at l with the maximum value and the maximum value −1, at l with the minimum value +1 and the minimum value) on each m, and the vectors for calculating the formula shown in FIG. 4 by the vector operation are decided.

According to the present invention, it is possible to speed up computation processing in the computation using a lattice.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A computing device provided with a processor having a Single Instruction Multiple Data (SIMD) function executing a plurality of operations by a single instruction, the device comprising:
- a deciding unit which, in computation of values of nodes on a lattice in a direction where a value of m representing a horizontal axis coordinate of the lattice increases, decides a range of nodes present on m=n, so as to enable the values to be calculated by executing a vector operation through the use of the SIMD function by using values of nodes on m=n−1;
- an in-range node value calculating unit calculating values of nodes within the range decided by said deciding unit, among the nodes present on m=n, by executing the vector operation through the use of the SIMD function by using the values of the nodes on m=n−1; and
- an out-of-range node value calculating unit calculating values of nodes outside the range decided by said deciding unit, among the nodes present on m=n, without using the SIMD function.

2. A calculating method in a computer provided with a processor having a SIMD function executing a plurality of operations by a single instruction, the method comprising:
- a deciding step where, in computation of values of nodes on a lattice in a direction where a value of m representing a horizontal axis coordinate of the lattice increases, the computer decides a range of nodes present on m=n so as to be able to calculate the values by executing a vector operation through the use of the SIMD function by using values of nodes present on m=n−1;
- an in-range node value calculating step where the computer calculates values of nodes within the range decided in said deciding step, among the nodes present on m=n, by executing the vector operation through the use of the SIMD function by using the values of the nodes on m=n−1; and
- an out-of-range node value calculating step where the computer calculates values of nodes outside the range decided by said deciding unit, among the nodes present on m=n, without using the SIMD function.

3. A non-transitory computer readable medium comprising a program product causing a computer provided with a processor having a SIMD function executing a plurality of operations by a single instruction to function as:
- a deciding unit which, in computation of values of nodes on a lattice in a direction where a value of m representing a horizontal axis coordinate of the lattice increases, decides a range of nodes present on m=n, so as to enable the values to be calculated by executing a vector operation through the use of the SIMD function by using values of nodes on m=n 1;
- an in-range node value calculating unit calculating values of nodes within the range decided by said deciding unit, among the nodes present on m=n, by executing the vector operation through the use of the SIMD function by using the values of the nodes on m=n−1; and
- an out-of-range node value calculating unit calculating values of nodes outside the range decided by said deciding unit, among the nodes present on m=n, without using the SIMD function.

* * * * *